(12) United States Patent
Hsu et al.

(10) Patent No.: US 10,800,486 B2
(45) Date of Patent: Oct. 13, 2020

(54) DAMPING TRANSMISSION DEVICE

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 336 days.

(21) Appl. No.: 15/806,390

(22) Filed: Nov. 8, 2017

(65) Prior Publication Data

US 2018/0141614 A1  May 24, 2018

(30) Foreign Application Priority Data

Nov. 22, 2016  (TW) .............................. 105138296 A (51) Int. Cl.
*B62M 9/04* (2006.01)
*F16H 9/24* (2006.01)
*F16H 9/04* (2006.01)

(52) U.S. Cl.
CPC ................. *B62M 9/04* (2013.01); *F16H 9/04* (2013.01); *F16H 9/24* (2013.01)

(58) Field of Classification Search
CPC ................ B62M 9/04; F16H 9/04; F16H 9/24
See application file for complete search history.

(56) References Cited

U.S. PATENT DOCUMENTS 3,845,666 A * 11/1974 Avramidis ............... F01P 7/046
74/336 R
5,979,924 A * 11/1999 D'Aluisio ............ B62K 25/286
280/259
9,630,680 B1 * 4/2017 Griffith, Jr. ............ B62M 25/06
2005/0098368 A1 * 5/2005 Puzey .................. B62K 15/006
180/219
2006/0122016 A1 * 6/2006 Hee .......................... B62M 1/36
474/80
2006/0237945 A1 * 10/2006 Hauer ..................... B62M 1/36
280/260
2007/0290478 A1 * 12/2007 Ting ........................ B62K 5/00
280/260
2010/0219606 A1 * 9/2010 Padilla Orozco ........ B62M 9/02
280/261

(Continued)

*Primary Examiner* — Michael R Mansen
*Assistant Examiner* — Robert T Reese
(74) *Attorney, Agent, or Firm* — WPAT, PC (57) ABSTRACT

A damping transmission device includes a driving shaft, a driven shaft and a first and a second transmission mechanism. The driving shaft drives the driven shaft to rotate via alternating operation of the first and second transmission mechanisms. The first transmission mechanism is a low-torque, high-speed transmission mechanism including a first driving wheel, a first driven wheel diametrically smaller than the first driving wheel, and a first transmission element wound on the first driving and driven wheels. The second transmission mechanism is a high-torque, low-speed transmission mechanism including a second driving wheel, a second driven wheel diametrically larger than the second driving wheel, and a second transmission element wound on the second driving and driven wheels. The damping transmission device automatically switches between the first and second transmission mechanisms in response to road surface condition and pedaling speed to produce a damping effect, enabling smoother transmission and labor-saving bike pedaling.

7 Claims, 8 Drawing Sheets

(56) References Cited

U.S. PATENT DOCUMENTS

2014/0366661 A1* 12/2014 Crepin ................... B62M 9/04
            74/89
2017/0106866 A1*  4/2017 Schieffelin ............ B62M 9/122
2017/0313385 A1* 11/2017 Emura ................... B62M 9/04

* cited by examiner

DAMPING TRANSMISSION DEVICE

FIELD OF THE INVENTION

The present invention relates to a damping transmission device, and more particularly, to a transmission device for vehicles. The damping transmission device automatically switches between a low-torque high-speed transmission mechanism and a high-torque low-speed transmission mechanism thereof to output different transmission torques in response to a reaction force of the road surface and a vehicle speed, and accordingly, produces a damping effect to enable smoother motion transmission.

BACKGROUND OF THE INVENTION

A bicycle includes a pedal-driven driving shaft, a driving sprocket wheel set mounted on the driving shaft, a driven shaft for driving a rear wheel to rotate, a driven sprocket wheel set mounted on the driven shaft, and a chain wound on the driving sprocket wheel set and the driven sprocket wheel set. When a bicycle rider pedals, the rear wheel of the bicycle is driven to rotate, bringing the bicycle to move forward.

A general-purpose bicycle has only one driving sprocket wheel included in the driving sprocket wheel set and only one driven sprocket wheel included in the driven sprocket wheel set. The driving sprocket wheel has an outer diameter larger than that of the driven sprocket wheel. Given that a ratio of the outer diameter (or the number of teeth) of the driving sprocket wheel to the outer diameter (or the number of teeth) of the driven sprocket wheel is A. The larger the value of A is, the higher the bicycle speed can be reached. Meanwhile, the larger value of A means a lower torque is transmitted by the driving sprocket wheel. In other words, with a larger value of A, it will be more laborious to start pedaling the bicycle, ride on a rough road surface that produces an increased tire rolling resistance, or ride on an ascending slope. In the case of a bicycle not for high-speed riding or a bicycle for children, the value of A can be 3 or so for a bicycle rider to drive the bicycle in a labor-saving manner.

As to the currently commercially available multi-speed bicycle, two or more driving sprocket wheels are included in the driving sprocket wheel set and two or more driven sprocket wheels are included in the driven sprocket wheel set, and the transmission chain can be automatically moved from one set of driving and driven sprocket wheels to a different set of driving and driven sprocket wheels to achieve the purpose of shifting the bicycle into different gears. In other words, when a larger output torque is needed, the rider can shift the bicycle into a lower gear. On the other hand, when a higher speed is needed, the rider can shift the bicycle into a higher gear. However, the multi-speed bicycle includes derailleur gears in it transmission system that require a high manufacturing cost and are suitable for installing on a correspondingly high-value bicycle. In addition, to drive the multi-speed bicycle safely, the rider must have sufficient experience in operating the derailleur gears.

SUMMARY OF THE INVENTION

A primary object of the present invention is to provide a damping transmission device, which combines and automatically switches between a low-torque high-speed transmission mechanism and a high-torque low-speed transmission mechanism thereof. These two transmission mechanisms operate alternately, so as to output different transmission torques in response to a reaction force of the road surface and a vehicle speed and accordingly, produces a damping effect to enable smoother motion transmission.

Another object of the present invention is to provide a damping transmission device, which is simple in structure and easy to manufacture while provides good transmission performance.

To achieve the above and other objects, the damping transmission device according to the present invention includes a driving shaft, a driven shaft, a first transmission mechanism and a second transmission mechanism. The driving shaft drives the driven shaft to rotate via alternating operation of the first and the second transmission mechanism. The first transmission mechanism is a low-torque, high-speed transmission mechanism, and the second transmission mechanism is a high-torque, low-speed transmission mechanism. The damping transmission device automatically switches between the first and the second transmission mechanism to produce a damping effect, enabling smoother motion transmission. When the damping transmission device is applied to a bicycle, it enables the bike rider to pedal in a labor-saving manner.

The first transmission mechanism includes a first driving wheel, a first driven wheel and a first transmission element. The first driving wheel has an outer diameter larger than that of the first driven wheel. The first transmission element is wound on the first driving wheel and the first driven wheel, such that the first driving wheel drives the first driven wheel to rotate via the first transmission element. The first driving wheel and the first driven wheel can be sprocket wheels or belt wheels, and the first transmission element can be a transmission chain or a transmission belt.

The second transmission mechanism includes a second driving wheel, a second driven wheel and a second transmission element. The second driven wheel has an outer diameter larger than that of the second driving wheel. The second transmission element is wound on the second driving wheel and the second driven wheel, such that the second driving wheel drives the second driven wheel to rotate via the second transmission element. The second driving wheel and the second driven wheel can be sprocket wheels or belt wheels, and the second transmission element can be a transmission chain or a transmission belt.

The first driving wheel and the second driving wheel are mounted on the driving shaft. The driving shaft drives the first driving wheel or the second driving wheel to rotate. A one-way bearing is mounted between the first driving wheel and the driving shaft, such that the driving shaft drives the first driving wheel to rotate in only one direction. Another one-way bearing is mounted between the second driving wheel and the driving shaft, such that the driving shaft drives the second driving wheel to rotate in only one direction.

The first driven wheel and the second driven wheel are mounted on the driven shaft, and a one-way bearing is mounted between the driven shaft and each of the first and the second driven wheel, such that the first driven wheel drives the driven shaft to rotate in only one direction and the second driven wheel can also drive the driven shaft to rotate in only one direction.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and by referring to the accompanying drawings. For the purpose of easy to understand, elements that are the same in the preferred embodiments are denoted by the same reference numerals. Please refer to FIGS. 1 to 3. A damping transmission device according to a first embodiment of the present invention includes a driving shaft 10, a driven shaft 20, a first transmission mechanism 30 and a second transmission mechanism 40. The driving shaft 10 drives the driven shaft 20 to rotate via the first transmission mechanism 30 and the second transmission mechanism 40.

Figure 1:
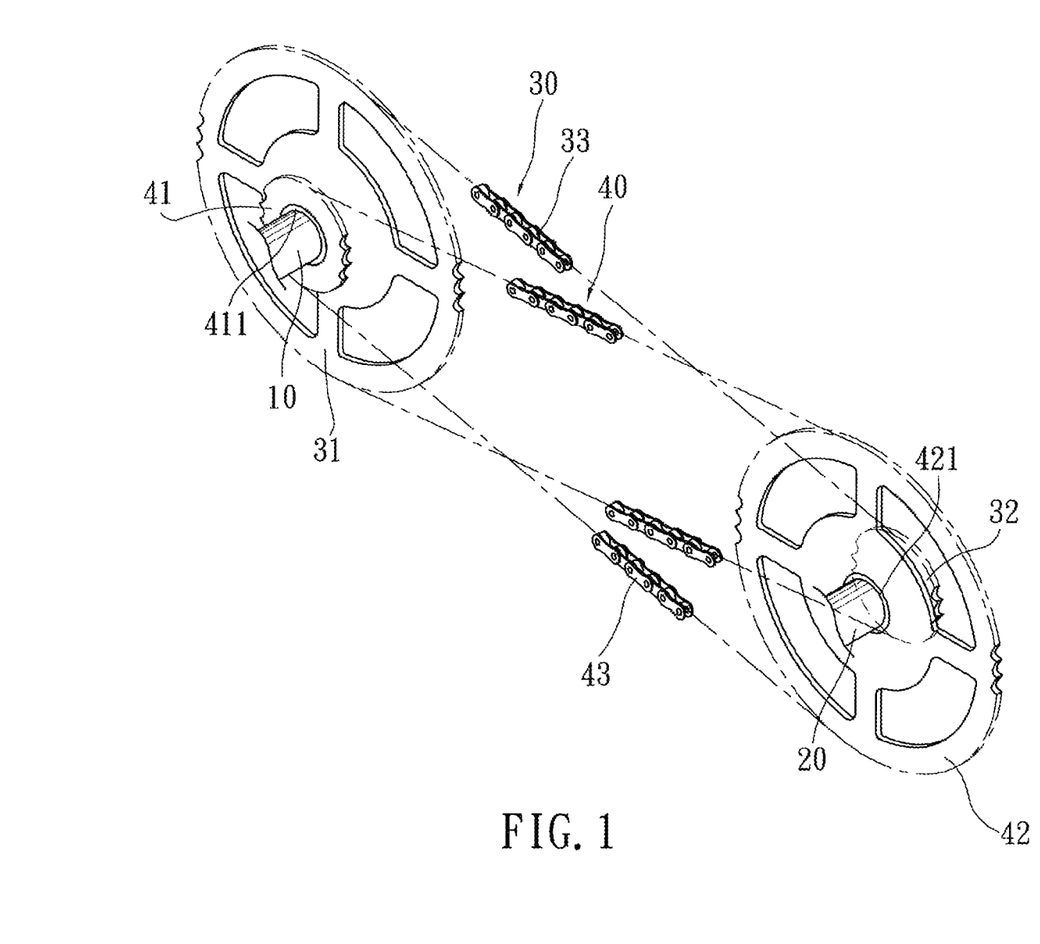
FIG. 1 is a perspective view of a damping transmission device according to a first embodiment of the present invention.
Figure 2:
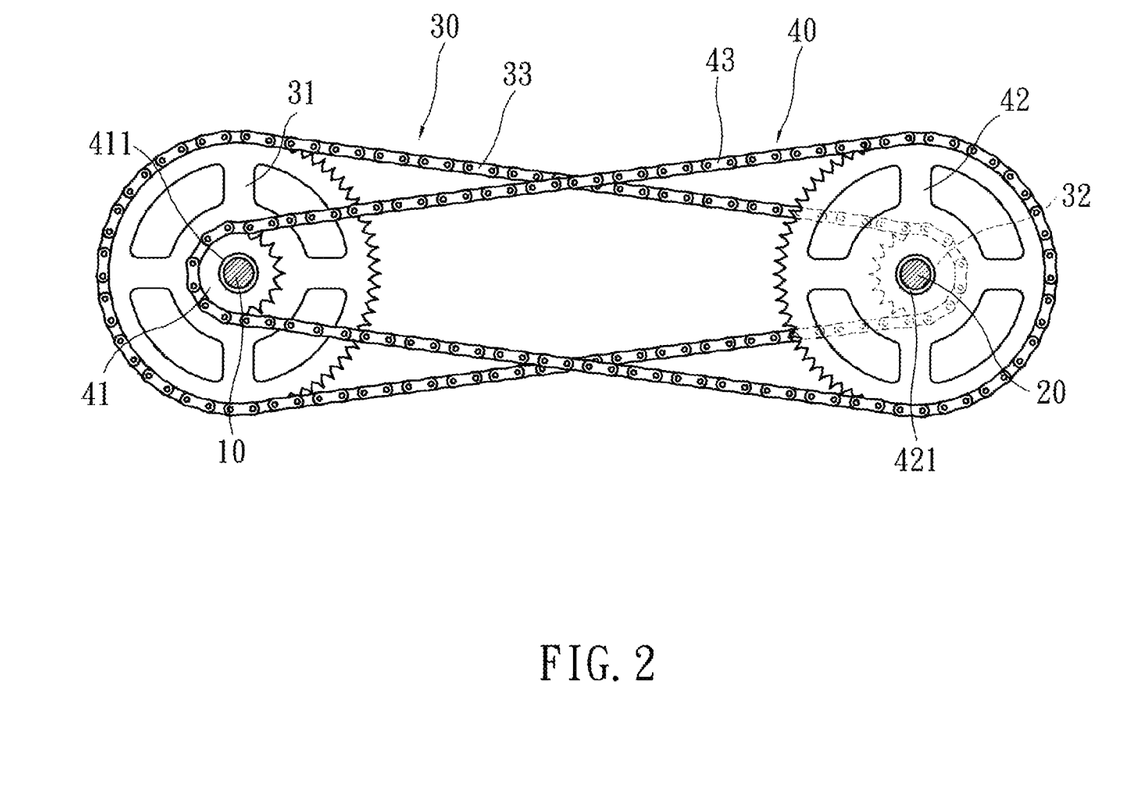
FIG. 2 is a front view of the damping transmission device of FIG. 1.
Figure 3:
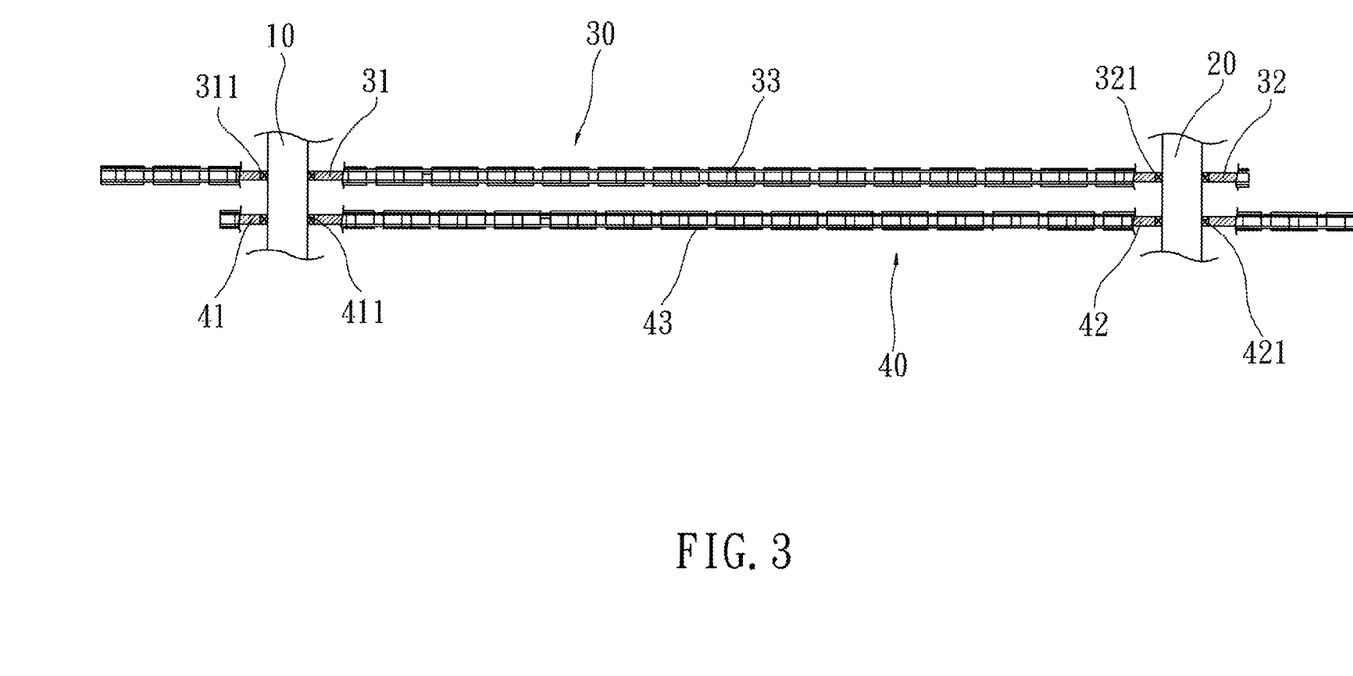
FIG. 3 is a top view of the damping transmission device of FIG. 1.

The first transmission mechanism 30 includes a first driving wheel 31, a first driven wheel 32 and a first transmission element 33. The first driving wheel 31 has an outer diameter larger than that of the first driven wheel 32. In practical implementation of the present invention, the first driving wheel 31 can have an outer diameter that is twice to three times as large as the outer diameter of the first driven wheel 32. The first transmission element 33 is in the form of a loop wound on the first driving wheel 31 and the first driven wheel 32, so that the first driving wheel 31 can drive the first driven wheel 32 to rotate via the first transmission element 33. The first transmission mechanism 30 is a low-torque, high-speed transmission mechanism, which enables a bicycle to accelerate faster.

The second transmission mechanism 40 includes a second driving wheel 41, a second driven wheel 42 and a second transmission element 43. The second driven wheel 42 has an outer diameter larger than that of the second driving wheel 41. In practical implementation of the present invention, the second driven wheel 42 can have an outer diameter that is twice to three times as large as the outer diameter of the second driving wheel 41. The second transmission element 43 is in the form of a loop wound on the second driving wheel 41 and the second driven wheel 42, so that the second driving wheel 41 can drive the second driven wheel 42 to rotate via the second transmission element 43. The second transmission mechanism 40 is a high-torque, low-speed transmission mechanism, which enables a bicycle rider to pedal the bicycle in a labor-saving manner.

In the first embodiment, the first driving wheel 31, the second driving wheel 41, the first driven wheel 32 and the second driven wheel 42 are sprocket wheels; and the first transmission element 33 and the second transmission element 43 are transmission chains.

The first driving wheel 31 and the second driving wheel 41 are mounted on the driving shaft 10. The driving shaft 10 drives the first or the second driving wheel 31, 41 to rotate. The damping transmission device can cause the driving shaft 10 to automatically select to drive the first driving wheel 31 or the second driving wheel 41 according to a needed transmission torque. The first driving wheel 31 has an outer diameter larger than that of the second driving wheel 41. In practical implementation of the present invention, the first driving wheel 31 can have an outer diameter that is twice to three times as large as the outer diameter of the second driving wheel 41.

The first driven wheel 32 and the second driven wheel 42 are mounted on the driven shaft 20. The first driven wheel 32 drives the driven shaft 20 to rotate. The second driven wheel 42 can also drive the driven shaft 20 to rotate. The second driven sprocket wheel 42 has an outer diameter larger than that of the first driven sprocket wheel 32. In practical implementation of the present invention, the second driven sprocket wheel 42 can have an outer diameter that is twice to three times as large as the outer diameter of the first driven sprocket wheel 32.

A first one-way bearing 311 is mounted between the first driving wheel 31 and the driving shaft 10 for the driving shaft 10 to drive the first driving wheel 31 to rotate in only one direction. A second one-way bearing 411 is mounted between the second driving wheel 41 and the driving shaft 10 for the driving shaft 10 to drive the second driving wheel 41 to rotate in only one direction.

A third one-way bearing 321 is mounted between the first driven wheel 32 and the driven shaft 20 for the first driven wheel 32 to drive the driven shaft 20 to rotate in only one direction. A fourth one-way bearing 421 is mounted between the second driven wheel 42 and the driven shaft 20 for the second driven wheel 42 to drive the driven shaft 20 to rotate in only one direction.

In the present invention, the first transmission mechanism 30 and the second transmission mechanism 40 are combined to constitute a transmission device having a damping effect. The damping transmission device of the present invention in operation automatically selects the first transmission mechanism 30 or the second transmission mechanism 40 according to the torque and speed needed at the time of riding. For example, (1) when a rider starts pedaling the bicycle, i.e. when the bicycle is changed from a static state into a dynamic state, and a relatively high output torque is needed, the damping transmission device of the present invention will automatically select the second transmission mechanism 40 to produce a relatively high transmission torque, allowing the rider to pedal the bicycle in a labor-saving manner; (2) when the rider wants to ride at a higher speed and a lower output torque is required, the damping transmission device of the present invention will automatically select the first transmission mechanism 30 to timely enable an increased bicycle speed that is several times faster than the bicycle speed available with the second transmission mechanism 40; and (3) when the rider rides on a rough road and the bicycle speed is decreased instantly due to an increased tire rolling resistance on the rough road that necessitates the rider to make more effort to keep the bicycle moving forward, the damping transmission device of the present invention will instantly automatically select the second transmission mechanism 40 to timely produce a higher transmission torque, allowing the rider to pedal the bicycle in a labor-saving manner; and when the bicycle speed is increased later, the damping transmission device of the present invention will automatically select the first transmission mechanism 30 again. In brief, the damping transmission device can automatically switch between the first and the second transmission mechanism 30, 40, so that the output torque of the driving shaft 10 can be automatically increased or decreased in response to a reaction force of the road surface, allowing the rider to drive the bicycle in a labor-saving manner. This kind of change in torque is a damping effect.

In practical use of the present invention, when the damping transmission device automatically selects the second transmission mechanism 40 with high output torque, the first driven wheel 32 and the first transmission chain 33 of the first transmission mechanism 30 gradually become static to exert a backward pull on the first driving wheel 31, causing a reduced rotational speed of the first driving wheel 31. However, it is noted a reverse rotation of the first driving sprocket wheel 31 would not bring the driving shaft 10 to rotate. Similarly, when the damping transmission device automatically selects the first transmission mechanism 30 with high output rotational speed, the second driven wheel 42 and the second transmission chain 43 of the second transmission mechanism 40 gradually become static to exert a backward pull on the second driving wheel 41, causing a reduced rotational speed of the second driving sprocket wheel 41. However, it is noted a reverse rotation of the second driving sprocket wheel 41 would not bring the driving shaft 10 to rotate.

Figure 4:
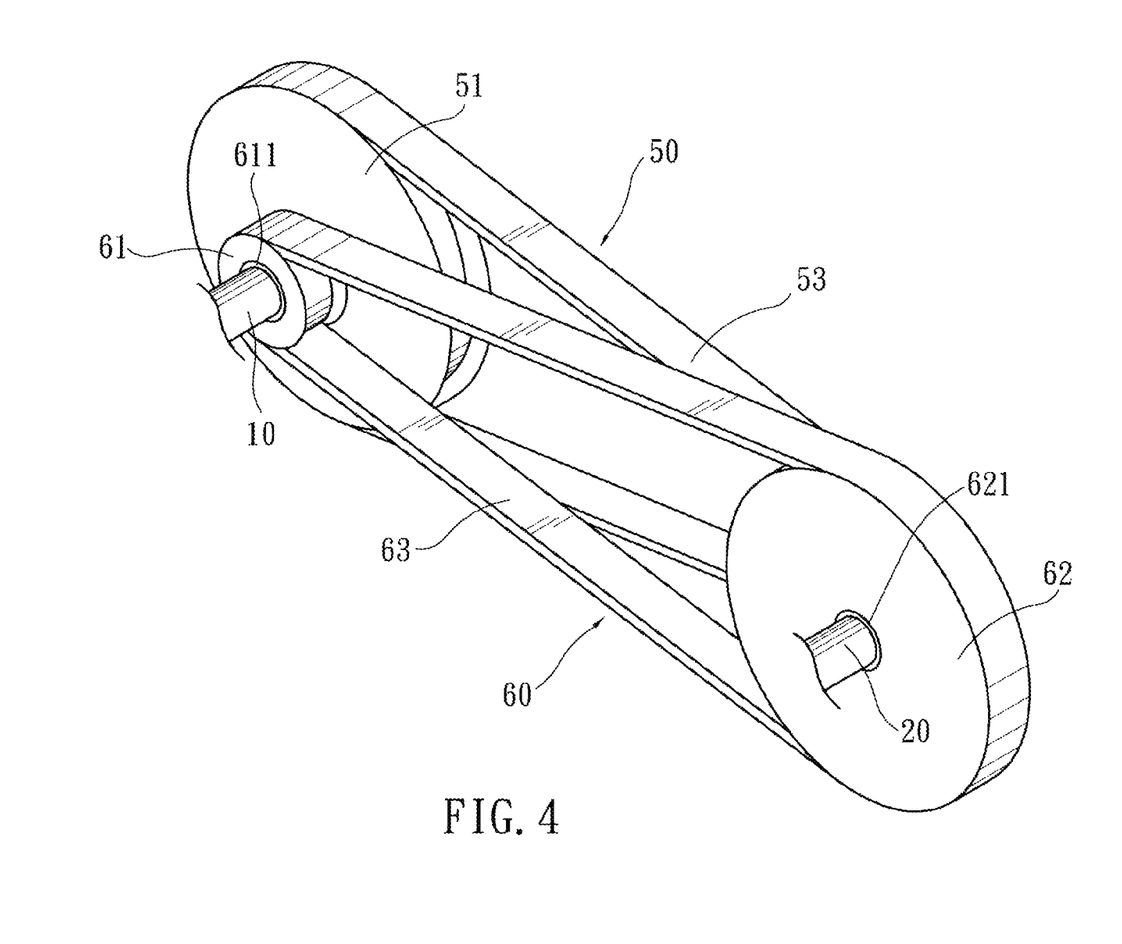
FIG. 4 is a perspective view of a damping transmission device according to a second embodiment of the present invention.
Figure 5:
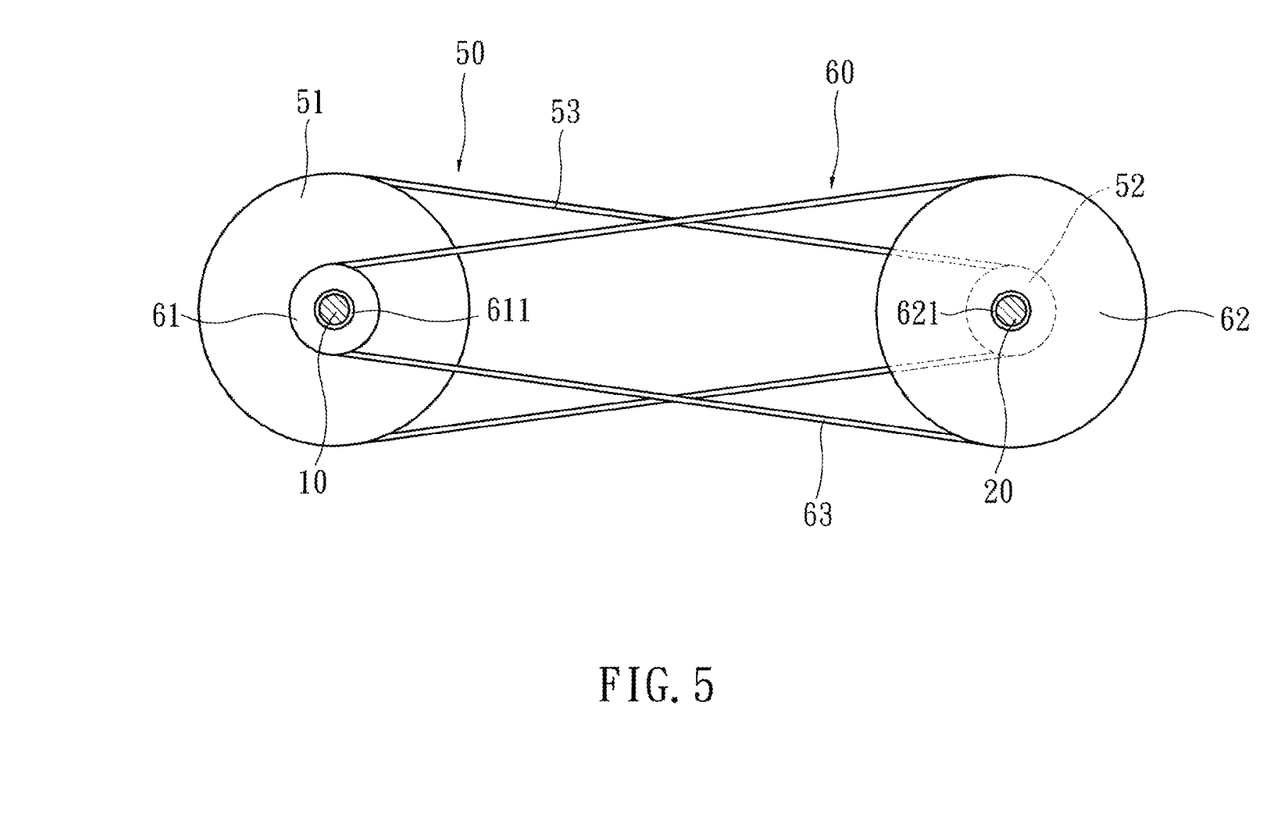
FIG. 5 is a front view of the damping transmission device of FIG. 4.
Figure 6:
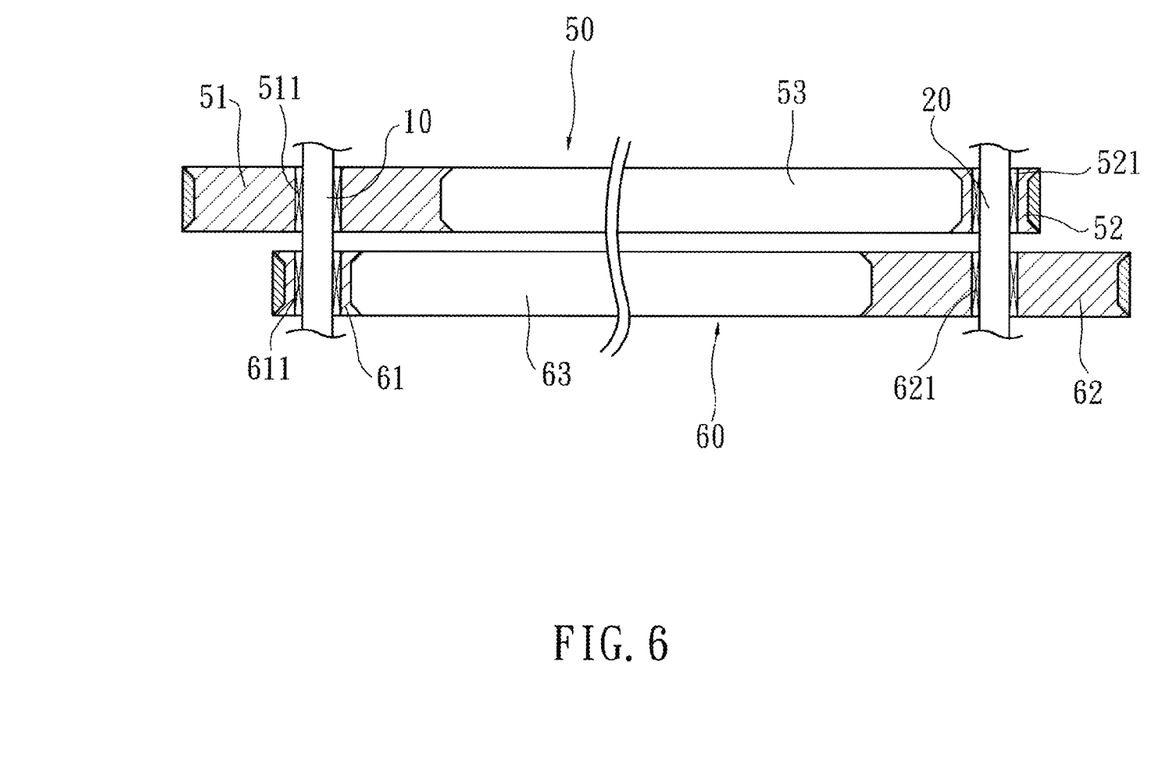
FIG. 6 is a top view of the damping transmission device of FIG. 4.

FIGS. 4 to 6 show a second embodiment of the present invention that can be applied to electric bicycles and motorcycles. The damping transmission device according to the second embodiment of the present invention includes a driving shaft 10, a driven shaft 20, a first transmission mechanism 50, and a second transmission mechanism 60. The driving shaft 10 drives the driven shaft 20 to rotate via the first transmission mechanism 50 and the second transmission mechanism 60.

The first transmission mechanism 50 includes a first driving belt wheel 51, a first driven belt wheel 52 and a first transmission belt 53. The first driving belt wheel 51 has an outer diameter larger than that of the first driven belt wheel 52. In practical implementation of the present invention, the first driving belt wheel 51 can have an outer diameter that is three times as large as the outer diameter of the first driven belt wheel 52. The first transmission belt 53 is in the form of a loop wound on the first driving belt wheel 51 and the first driven belt wheel 52, so that the first driving belt wheel 51 can drive the first driven belt wheel 52 to rotate via the first transmission belt 53. The first transmission mechanism 50 is a low-torque, high-speed transmission mechanism.

The second transmission mechanism 60 includes a second driving belt wheel 61, a second driven belt wheel 62 and a second transmission belt 63. The second driven belt wheel 62 has an outer diameter larger than that of the second driving belt wheel 61. In practical implementation of the present invention, the second driven belt wheel 62 can have an outer diameter that is three times as large as the outer diameter of the second driving belt wheel 61. The second transmission belt 63 is in the form of a loop wound on the second driving belt wheel 61 and the second driven belt wheel 62, so that the second driving belt wheel 61 can drive the second driven belt wheel 62 to rotate via the second transmission belt 63. The second transmission mechanism 60 is a high-torque, low-speed transmission mechanism.

A fifth one-way bearing 511 is mounted between the first driving belt wheel 51 and the driving shaft 10 for the driving shaft 10 to drive the first driving belt wheel 51 to rotate in only one direction. A sixth one-way bearing 611 is mounted between the second driving belt wheel 61 and the driving shaft 10 for the driving shaft 10 to drive the second driving belt wheel 61 to rotate in only one direction.

A seventh one-way bearing 521 is mounted between the first driven belt wheel 52 and the driven shaft 20 for the first driven belt wheel 52 to drive the driven shaft 20 to rotate in only one direction. An eighth one-way bearing 621 is mounted between the second driven belt wheel 62 and the driven shaft 20 for the second driven belt wheel 62 to drive the driven shaft 20 to rotate in only one direction.

Figure 7:
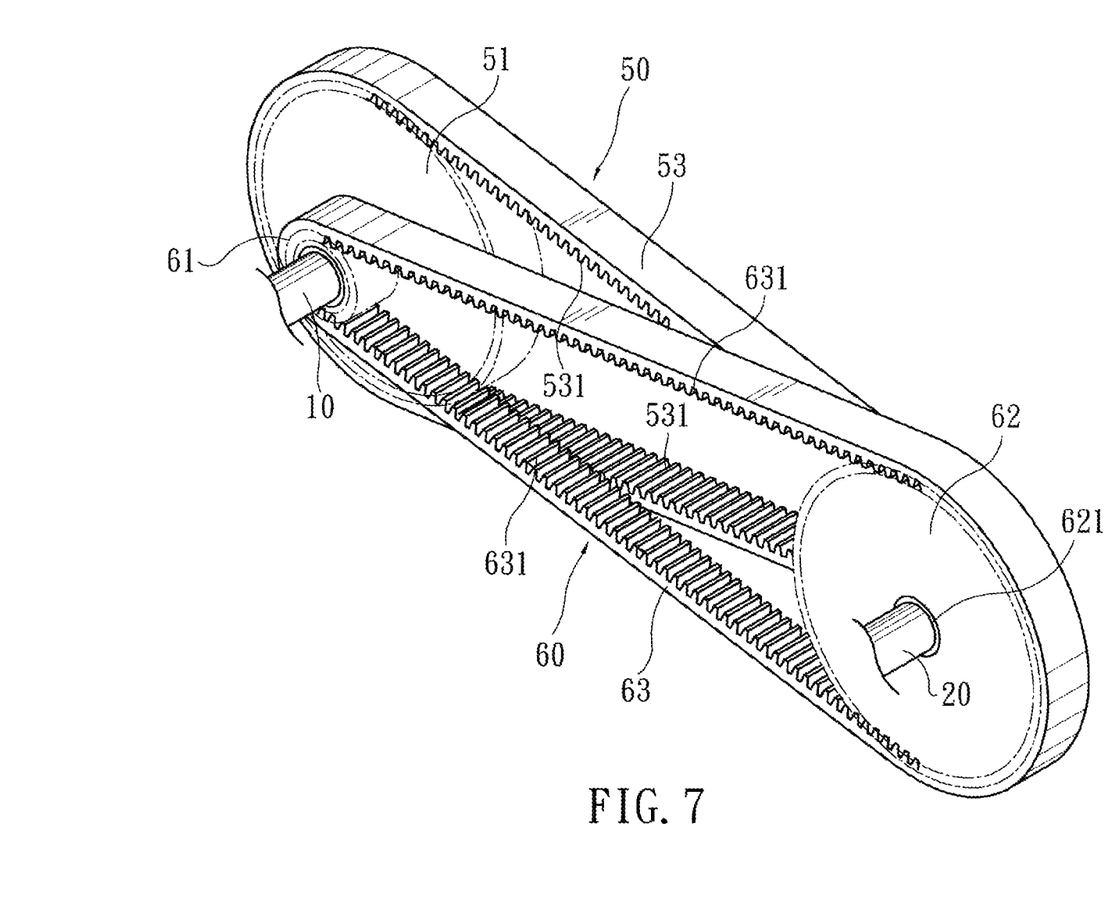
FIG. 7 is a perspective view of a damping transmission device according to a third embodiment of the present invention.
Figure 8:
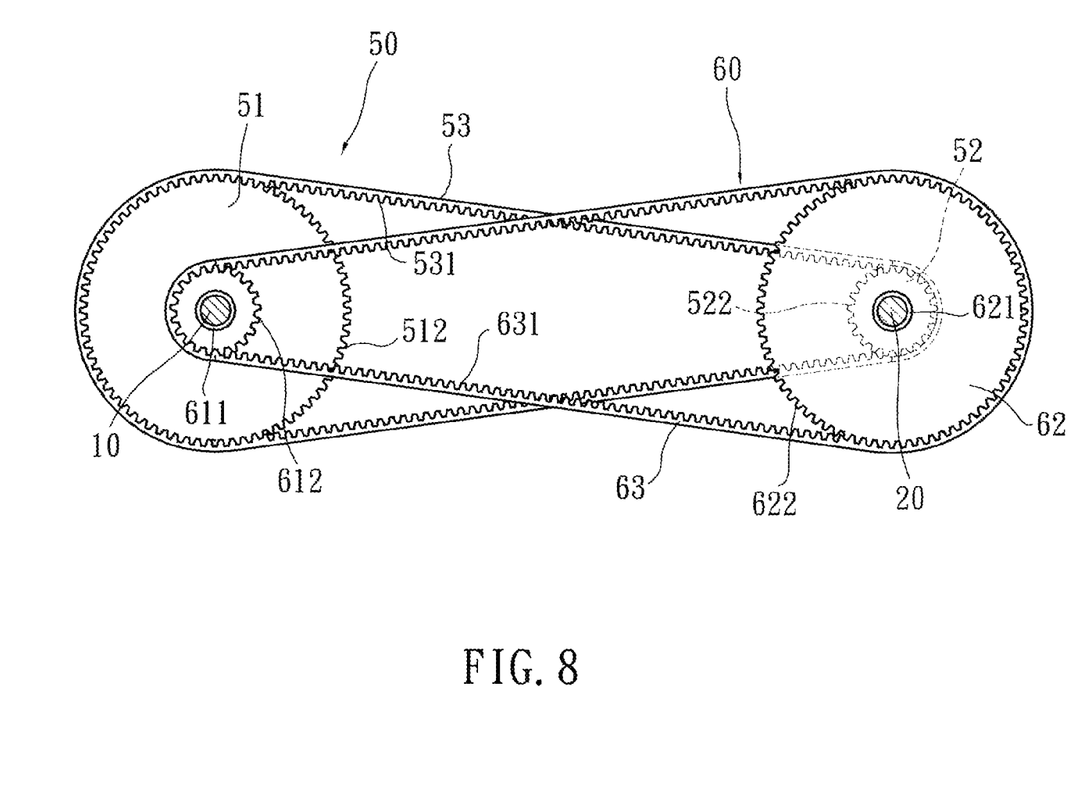
FIG. 8 is a front view of the damping transmission device of FIG. 7.

FIGS. 7 and 8 show a third embodiment of the present invention, which is a variation of the second embodiment. In the third embodiment, the first driving belt wheel 51 and the first driven belt wheel 52 of the first transmission mechanism 50 have a plurality of transverse grooves 512, 522, respectively, equally spaced along their circumferential surfaces, so that the first driving belt wheel 51 and the first driven belt wheel 52 respectively have a toothed circumferential surface. Further, the first transmission belt 53 has a plurality of transverse ridges 531 equally spaced along its inner side surface. The ridges 531 on the first transmission belt 53 sequentially engage with the grooves 512, 522 on the first driving belt wheel 51 and the first driven belt wheel 52 to transmit an even higher transmission torque.

The second driving belt wheel 61 and the second driven belt wheel 62 of the second transmission mechanism 60 have a plurality of transverse grooves 612, 622, respectively, equally spaced along their circumferential surfaces, so that the second driving belt wheel 61 and the second driven belt wheel 62 respectively have a toothed circumferential surface. The second transmission belt 63 has a plurality of transverse ridges 631 equally spaced along its inner side surface. The ridges 631 on the second transmission belt 63 sequentially engage with the grooves 612, 622 on the second driving belt wheel 61 and the second driven belt wheel 62 to transmit an even higher transmission torque.

In summary, the damping transmission device according to the present invention combines and automatically switches between the first transmission mechanism 30, 50 and the second transmission mechanism 40, 60 to output different transmission torques in response to road surface condition and pedaling speed and accordingly produces a damping effect, making the damping transmission device of the present invention a novel design capable of working more smoothly and allowing a bicycle rider to pedal in a more labor-saving manner.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A damping transmission device, comprising:
a driving shaft;
a driven shaft;
a first transmission mechanism including a first driving wheel, a first driven wheel and a first transmission element; the first driving wheel having an outer diameter larger than that of the first driven wheel; the first transmission element being in the form of a loop wound on the first driving wheel and the first driven wheel for the first driving wheel to drive the first driven wheel to rotate via the first transmission element; the first driving wheel being mounted on the driving shaft with a one-way bearing mounted between the first driving wheel and the driving shaft, such that the driving shaft drives the first driving wheel to rotate in only one direction; and the first driven wheel being mounted on the driven shaft with a one-way bearing mounted between the first driven wheel and the driven shaft, such that the first driven wheel drives the driven shaft to rotate in only one direction; and a second transmission mechanism including a second driving wheel, a second driven wheel and a second transmission element; the second driving wheel having an outer diameter smaller than that of the second driven wheel; the second transmission element being in the form of a loop wound on the second driving wheel and the second driven wheel for the second driving wheel to drive the second driven wheel to rotate via the second transmission element;

the second driving wheel being mounted on the driving shaft with a one-way bearing mounted between the second driving wheel and the driving shaft, such that the driving shaft drives the second driving wheel to rotate in only one direction; and the second driven wheel being mounted on the driven shaft with a one-way bearing mounted between the second driven wheel and the driven shaft, such that the second driven wheel drives the driven shaft to rotate in only one direction.

2. The damping transmission device as claimed in claim 1, wherein the first driving wheel of the first transmission mechanism has an outer diameter that is twice to three times as large as an outer diameter of the first driven wheel.

3. The damping transmission device as claimed in claim 1, wherein the second driven wheel of the second transmission mechanism has an outer diameter that is twice to three times as large as an outer diameter of the second driving wheel.

4. The damping transmission device as claimed in claim 1, wherein the first driving wheel, the second driving wheel, the first driven wheel and the second driven wheel are sprocket wheels; and the first transmission element and the second transmission element are transmission chains.

5. The damping transmission device as claimed in claim 1, wherein the first driving wheel, the second driving wheel, the first driven wheel and the second driven wheel are belt wheels; and the first transmission element and the second transmission element are transmission belts respectively in the form of a loop.

6. The damping transmission device as claimed in claim 5, wherein the first driving belt wheel and the first driven belt wheel of the first transmission mechanism have a plurality of transverse grooves equally spaced along their respective circumferential surfaces and accordingly have a toothed circumferential surface each, and the first transmission belt has a plurality of transverse ridges equally spaced along its inner side surface; and the ridges on the first transmission belt sequentially engaging with the grooves on the first driving belt wheel and the first driven belt wheel.

7. The damping transmission device as claimed in claim 5, wherein the second driving belt wheel and the second driven belt wheel of the second transmission mechanism have a plurality of transverse grooves equally spaced along their respective circumferential surfaces and accordingly have a toothed circumferential surface each, and the second transmission belt has a plurality of transverse ridges equally spaced along its inner side surface; and the ridges on the second transmission belt sequentially engaging with the grooves on the second driving belt wheel and the second driven belt wheel.

\* \* \* \* \*